United States Patent [19]

Ciliberti et al.

[11] 3,969,452
[45] July 13, 1976

[54] METHOD FOR CASTING AND HANDLING ULTRA-THIN REVERSE OSMOSIS MEMBRANES

[75] Inventors: David F. Ciliberti; Luciano C. Scala, both of Murrysville, Pa.

[73] Assignee: The United States of America as represented by the Secretary of the Department of the Interior, Washington, D.C.

[22] Filed: Aug. 8, 1974

[21] Appl. No.: 495,758

[52] U.S. Cl............................. 264/41; 210/23 H; 210/500 M; 264/317; 264/DIG. 44
[51] Int. Cl.²................ B29D 27/04; B29C 1/06; B01D 13/00; B01D 39/16
[58] Field of Search ........ 264/49, 41, 317, DIG. 44; 210/490, 500, 23 H, 500 M

[56] References Cited
UNITED STATES PATENTS

| | | | |
|---|---|---|---|
| 2,707,201 | 4/1955 | Fernald et al. | 264/49 X |
| 2,894,289 | 7/1959 | Harper et al. | 264/49 |
| 3,424,824 | 1/1969 | Harbard et al. | 264/49 X |
| 3,514,313 | 5/1970 | Martel et al. | 264/DIG. 5 |
| 3,544,358 | 12/1970 | Manjikian | 264/49 X |
| 3,616,520 | 11/1971 | Bucalo | 264/317 X |
| 3,791,526 | 12/1974 | Stana et al. | 210/490 X |
| 3,836,423 | 9/1974 | Wagner et al. | 264/DIG. 5 |

OTHER PUBLICATIONS

U.S. Office of Saline Water, "Second Report on Fabrication and Evaluation of New Ultrathin Reverse Osmosis Membranes," by P. S. Francis and J. E. Calotte, Research and Development Progress Report No. 247, Apr. 1967, Washington, D.C., U.S. Dept. Of Interior, pp. 6–16.

U.S. Office of Saline Water, "Reverse Osmosis Membrane Research," by U. Merten, H. K. Lonsdale, R. L. Riley and K. D. Vos, Research and Development Progress Report No. 265, Aug. 1967, Washington, D.C., U.S. Dept. of Interior, pp. 57–80.

Primary Examiner—Philip Anderson
Attorney, Agent, or Firm—Donald R. Fraser

[57] ABSTRACT

A method of casting ultra-thin semipermeable membranes comprises the steps of: (A) applying a coating of a film forming water soluble solution, containing a leachable pore producing agent and a polymer which is not substantially degraded by organic polar solvents, onto a smooth casting surface, (B) drying the coating to form a support film about 0.5–10 mils thick, (C) applying a coating of an organic polymeric membrane coating solution onto the support film, and drying the coating to form a semipermeable reverse osmosis membrane film about 0.01–1.0 mil thick and (D) applying a leaching liquid to the films, to cause pore formation in the support film and to form a composite consisting of a 0.01–1.0 mil thick semipermeable membrane, supported by a 0.5–10 mils thick water soluble film support of between about 5–50% porosity.

19 Claims, 1 Drawing Figure

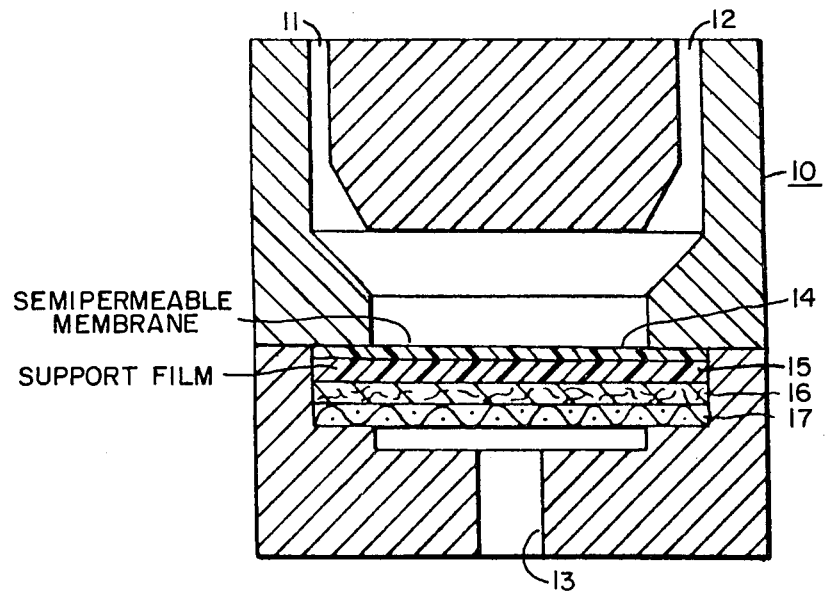

METHOD FOR CASTING AND HANDLING ULTRA-THIN REVERSE OSMOSIS MEMBRANES

The invention described herein was made in the performance of work under an Office of Saline Water contract.

BACKGROUND OF THE INVENTION

Generally, pure water flux characteristics of most reverse osmosis membranes can be greatly enhanced, without commensurate decrease in impurity rejection capability, by reducing the membrane thickness from the standard 5 to 15 mils, to the ultra-thin 0.01 to 1 mil range. To date, use of ultra-thin membranes, especially those having a substantially uniform cross section; has been hampered by the inability to handle these symmetric membrane films after casting. The glass casting plates usually employed as the film casting surface are smooth, heat and solvent resistant, and provide a suitable wettable surface with the solvents generally used; however, the ultra-thin membranes adhere to the plates to such an extent that it is virtually impossible to remove the membranes without damage. It is even more difficult to insert the ultra-thin membranes into a liquid purification system without harming them in the process.

Riley, in U.S. Pat. No. 3,648,845, formed 0.004 mil thick cellulose acetate membranes, in situ, on a porous glass, metal or ceramic support. The support had its pores covered by a polyacrylic acid barrier layer which was disposed between the membrane and the support, and which could be partially dissolved away. This provided a direct method of making a cellulose acetate membrane-solid support system, which avoided the ultra-thin membrane handling problem. A method to solve the handling problem especially for symmetric reverse osmosis membranes is needed.

SUMMARY OF THE INVENTION

Applicants have provided a method for handling ultra-thin reverse osmosis membranes. Applicants' method includes but is not limited to the steps of casting a support film of water soluble polymer, which is not substantially degraded by organic polar solvents, preferably polyacrylic acid, between 0.5–10 mils thick, on a smooth, heat and solvent resistant plate; after which, a reverse osmosis membrane, such as, for example, an ultra-thin substantially symmetric cellulose acetate, polyamic acid salt or polyamino-acid-amide polymer membrane, is cast to form a film about 0.01 to 1 mil thick on the polyacrylic support. The membrane-polyacrylic acid composite is then removed from the plate by peeling, brief immersion in water or other suitable means; after which it can be inserted without handling problems or damage into a liquid purification system, with the membrane facing the feed inlet. After application of the feed to the composite, the polyacrylic acid film gradually dissolves and is carried away from the membrane by the purified liquid, leaving the ultra-thin reverse osmosis membrane in situ.

BRIEF DESCRIPTION OF THE DRAWING

For a better understanding of the invention, reference may be made to the preferred embodiment, exemplary of the invention, shown in the accompanying drawing, which is a cross-sectional illustration of one type of liquid purification system, which may incorporate an ultra-thin reverse osmosis membrane made by the method of this invention.

DESCRIPTION OF THE PREFERRED EMBODIMENTS

Osmosis occurs when two solutions of different concentrations in the same solvent are separated from one another by a membrane. If the membrane is ideally semi-permeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well-defined value. The pressure difference at which no flow occurs is termed the osmotic pressure difference. If a pressure in excess of this osmotic pressure is applied to the more concentrated solution, then the solvent can be caused to flow into the more dilute solution. The names "reverse osmosis", and "pressure osmosis" are used to describe this process.

The drawing illustrates one type of liquid purification system into which the composite formed in this invention can be inserted. The reverse osmosis cell 10 contains a feed water opening 11, which may be angled to distribute the feed water against the reverse osmosis membrane. The cell also contains a feed water exit 12. Purified water is removed through the pure water exit 13, behind the semipermeable reverse osmosis membrane 14. The membrane in this case will be attached to a polyacrylic acid support film 15, with the membrane facing the feed solution side of the cell. Also shown are soft microporous paper layers 16, disposed next to a stainless steel wire cloth support 17, or other suitable porous or perforated plate support.

After application of the feed, the polyacrylic acid film gradually dissolves and is carried away from the membrane through the paper and support by the purified liquid. The ultra-thin membrane then gradually contacts the microporous paper. The surface of the paper is a type which will not cause membrane puncture under applied pressure, the paper generally being a millipore filter of a type well known in the art, with a mean pore size approximately between about 0.5–3 microns.

The membranes that can be used in the method of this invention include film forming cellulosic ether or cellulosic ester materials, for example, cellulose acetate, cellulose acetate-butyrate, cellulose propionate and ethyl cellulose. These materials are well known in the art, and cellulose acetate, the preferred polymeric film-forming cellulosic material, is described in U.S. Pat. No. 3,593,855, herein incorporated by reference.

Some examples of other types of useful membranes are polyamic acid salt membranes, and polyamino-acid-amide membranes, which are described in U.S. Pat. No. 3,835,207, and U.S. Pat. 3,817,386, respectively, both herein incorporated by reference, and polymeric membranes made from aromatic nitrogen containing compounds such as aromatic polyamides, aromatic polyhydrazides, aromatic polysemicarbazides and aromatic poly (amide-hydrazides), as described in U.S. Pat. No. 3,567,632, herein incorporated by reference. These membranes generally have a substantially uniform cross section.

Any semipermeable membrane that is effective to permit the effusion of water and the rejection of dissolved impurities therein, and which can be cast as a porous film having a thickness of between about 0.01 to 1.0 mil, is considered to be a candidate for the method of this invention. Most of the membranes of this type, and for which the method of this invention will be most useful, will be porous membranes having a substantially symmetrical and uniform cross section.

The preferred polyacrylic acid support film can be dip coated, cast, sprayed, or otherwise applied onto a suitable smooth plate or other type solid support as a first step in the method of this invention. The thickness of the polyacrylic acid layer after drying, preferably in a dustfree oven at a temperature of between about 25°–125°C, should be between about 0.5–10 mils. The polyacrylic acid is dried over a 20 sec.–48 hour interval, depending on the temperature, to yield a continuous, uniform, substantially non-porous film i.e. under about 5% porosity. Over 10 mils film thickness, and the film will generally afford too large a gap between the membrane and filter support during polyacrylic acid film dissolution in most flat plate liquid purification systems. Below 0.5 mil and film will not provide enough support for easy removal from the casting plate and will complicate handling.

Generally, the polyacrylic acid will be cast as an aqueous solution which may contain an effective small percentage of an alcohol solvent such as methyl alcohol, ethyl alcohol, n-propyl alochol, isopropyl alcohol, tert-butyl alcohol, n-pentyl alcohol, isopentyl alcohol, allyl alcohol, and ethylene glycol, (ethylene alcohol). The alcohol is added in amounts, generally about 1.5–5 wt%, effective as a plasticizing agent and to form pores in the polyacrylic film after water or other type leaching.

These alcohols or other type pore producing agents, such as formamide (methanamide), triethyl-phosphate and the like, should have a solubility of at least 50 gr/100 gr $H_2O$. Preferably the pore producing agent will have infinite solubility in 100 gr of $H_2O$ as described in *The Handbook Of Chemistry And Physics* under "Physical Constant Of Organic Compounds." The pore producing agent should provide about 5 to 50% porosity in the polyacrylic acid or other suitable support film after water leaching. This porosity allows the feed water to permeate the support film during the initial operation of the supported membrane in a reverse osmosis system, and to initiate the gradual dissolution of the water soluble support. When the porosity in the support is below about 5% the rate of support dissolution is too slow. When the porosity in the support is over 50% the pores on the surface may be so numerous and large as to cause membrane collapse during pressure operation, or cause formation of a discontinuous membrane film. The diameter of the pore openings at the surface of the dry polyacrylic acid film after water leaching should be in the range of about 0.025 – 0.25 microns i.e. up to about 0.01 mil diameter.

The polyacrylic acid solution should also contain an effective small percentage of a water soluble wetting agent. The wetting agent is added in amounts, generally about 1.5–3 wt%, effective to wet the particular casting surface used, so that the support film will adhere and flow properly. While these materials are well known in the art, the preferred wetting dispersant is a disodium ethoxylated nonylphenol half ester of sulfosuccinic acid, a water soluble anionic emulsifier. Other suitable anionic wetting agents would include, for example, sulfonated castor oil, sodium salts of alkyl aryl poly- ether sulfates or sulfonates, buffered aryl sodium sulfonates and sulfonated ester salts.

The concentration of the polyacrylic acid solution will be between about 5 to 50 wt% polyacrylic acid solids. The average molecular weight of the polyacrylic acid will be between about 10,000 and 50,000. Above 50,000 molecular weight and the rate of polyacrylic acid dissolution will be too slow for effective reverse osmosis operation.

The support film used in the method of this invention is preferably polyacrylic acid, however, other film forming water soluble polymers, which are not substantially degraded by the solvents used in the above-described useful membranes are suitable. Examples of some solvents the support film should be compatible which include organic polar solvents such as acetone, which may be used with cellulose acetate membranes; N,N-dimethylformamide (DMF), N,N-dimethyl-acetamide (DMAC), dimethylsulfoxide (DMSO), N-methyl-2-pyrrolidone, pyridine, formamide, N-methylformamide, butyrolacetone, N,N-diethylformamide, N,N-diethylacetamide, N,N-dimethylmethoxyacetamide, and hexamethylphosphoramide, alone or in mixtures, and other similar organic polar aprotic solvents which may be used with the membranes described as having a uniform cross-section.

In the method of this invention, a water soluble polymeric coating is applied to a generally smooth, solvent resistant plate, which is preferably polished glass. The coating is dried at a suitable temperature to form a substantially non-porous film having a thickness of 0.5–10 mils. The film comprises a water soluble polymeric material able to withstand substantial degradation by organic polar solvents. Preferably the film is polyacrylic acid having an average molecular weight between about 10,000–50,000.

A semipermeable membrane is then applied to the dried film. The semipermeable membrane will generally be applied as a casting solution from a suitable film casting apparatus, with an adjustable doctor blade, as is well known in the art. The thickness of the membrane after drying should be between about 0.01–1.0 mil. The membrane can be dried over a 15 sec.–48 hour interval, between 20°–200°C, depending on the type membrane used. The membrane-film support-plate composite is then briefly immersed in water for a time to cause leaching and pore formation in the substantially non-porous support film, and to remove the film supported membrane from the casting plate. This immersion period will generally be from 10–15 minutes, but may last from 5–60 minutes. Below 5 minutes and the porosity will be minimal; over 60 minutes and the support film may start to dissolve.

Other means of film supported membrane removal from the plate, such as peeling or cutting with a suitable type knife or wire can be used to provide the film supported membrane. In such an embodiment, the membrane, support composite can then be dipped briefly in water or other suitable leaching liquid to form pores in the polyacrylic acid support after removal from the plate.

In another embodiment of the method of this invention, the polyacrylic acid support can be cast, dried briefly immersed in water to remove it from the casting plate and allow the alcohol or other pore producing agents, which are generally infinitely soluble in water, to be leached or removed from the support film to form the necessary pores in the support. Then, the semipermeable reverse osmosis membrane may be cast onto the porous polyacrylic acid support and again briefly leached in water or other suitable leaching liquid if necessary.

EXAMPLE 1

A film of polyacrylic acid, formed from an aqueous solution containing 37.2 wt% polyacrylic acid solids having a molecular weight of between about 10,000–50,000, 3.72 wt% ethylene glycol used as a pore producing agent, and 3.72 wt% of disodium ethozylated nonylphenol half ester of sulfosuccinic acid used as a water soluble anionic wetting agent, was cast with a 6 mil doctor blade on a 1 foot × 1 foot smooth Pyrex glass plate. The ethylene glycol had infinite grams solubility per 100 grams of water.

The casting apparatus consisted of a casting apparatus having an adjustable horizontal blade, which controlled the height of a casting gap, extending along the length of the apparatus. The solution of polyacrylic acid flowed through the gap and onto the glass plate as the apparatus was moved to form the cast film.

This casting was placed in a dust-free oven at 100°C for 10 minutes. The plate with the polyacrylic acid film was then cooled to 25°C in a dust-free hood. The polyacrylic acid film thickness was about 3 mils and the film was smooth, and substantially non-porous i.e. less than about 5% porous.

A polyamic acid precursor was prepared as follows: a mixture of 43.25 gr (0.4 mole) of m-phenylenediamine, 307 gr of dimethylacetamide (DMAC), and 127 gr (1.2 moles) of sodium carbonate was stirred while adding a solution of 45.7 gr (0.225 mole) isophthaloyl chloride, 15.2 gr (0.075 mole) terephthaloyl chloride, and 103 gr xylene. Stirring was continued for 6 hours after the addition. Solids were filtered off, and the filtrate was distilled at 3–4 mm Hg (to remove water and xylene) until the residual solution was reduced to 253 gr.

This solution was diluted to 351 gr with dimethylacetamide and then stirred, while pyromellitic dianhydride was added in portions. About 16 gr was added rapidly. When it had dissolved, additional quantities of 0.1 to 0.5 gr were added at intervals. About 30 minutes after each addition, solution viscosity was determined before the next increment was added. The viscosity rose after each addition until 20.75 gr had been added. An additional 0.20 gr caused a decrease in viscosity, and no further material was added. The product was clear amber solution, 15 wt% solids, viscosity Z-1 (Gardner).

This membrane casting solution was then further diluted with DMAC to form a 2.5 wt% solids solution and cast with a 0.0005 inch (0.5 mil) doctor blade over the polyacrylic acid. The plate with the castings was then placed in a dust-free oven at 175°C for 5 minutes. The composite with the polyacrylic acid film disposed between the glass plate and amide-imide film was cooled to 25°C in a dust-free hood. This resulted in an amide-imide film having a substantially uniform and symmetrical, porous cross-section. The amide-imide film was about 0.0001 inch (0.1 mil) thick.

Interference colors were easily observed on the finished composite. The amide-imide semipermeable membrane with attached polyacrylic acid support film was easily removed from the glass plate by immersing the glass plate with the dried castings for 15–20 minutes in 35°C water. After this step of polyacrylic film had a porosity of between about 10–25% with surface pore diameters between about 0.001–0.025 micron.

A small sample about 2 inches in diameter was cut from the polyacrylic acid supported amide-imide membrane and mounted in a reverse osmosis system similar to that shown in the drawing, with the amide-imide membrane side facing the feed water entrance. Tap water containing about 100 parts per million dissolved solids was fed into the reverse osmosis system against and contacting the membrane at about 200 psi and 25°C. The results are shown in table 1 below:

Table 1

| Time (hr) | Rejection (%) | Pure Water Flux (gal/sq ft/day) |
|---|---|---|
| 24 | 62 | 16.0 |
| 48 | 68 | 17.5 |
| 120 | 67 | 22.7 |

The use of the polyacrylic acid support film allowed ease of separation of the ultra-thin membrane from the glass plate, ease of handling the membrane polyacrylic acid support after separation and ease of insertion into the reverse osmosis system. After 120 hours the system was taken apart. It was observed that the polyacrylic acid film had substantially dissolved, and the membrane was cushioned against the filter paper shown in the drawing, without puncture.

What is claimed is:

1. A method of casting ultra-thin semipermeable membranes on a water soluble film support comprising the steps of:
   A. applying a coating of a solution of a film forming water soluble polymer which is not substantially degraded by organic polar solvents, onto a smooth casting surface, wherein the solution contains between about 5–50 wt% solids and about 1.5–5 wt% of a leachable pore producing agent having a water solubility of at least 50 gr/100 gr water,
   B. drying the coating at between about 25°–125°C to form a water soluble, continuous support film of up to about 5% porosity about 0.5–10 mils thick on the casting surface,
   C. applying a coating of an organic, polymeric, membrane casting solution onto the support film and drying the coating for between 15 seconds to 48 hours at between about 20° to about 200°C to form a semipermeable reverse osmosis membrane film about 0.01–1.0 mil thick on the continuous support film, and
   D. applying a leaching liquid to the membrane-support films effective to leach pore producing agent from the support film and to cause formation of pores, between about 0.025–0.25 microns diameter, in the support film; to form a composite consisting of a 0.01–1.0 mil thick semi-permeable membrane supported by a 0.5–10 mil thick water soluble film support of between about 5–50% porosity.

2. The method of claim 1, wherein the film forming water soluble polymer is polyacrylic acid.

3. The method of claim 2, wherein the polyacrylic acid has an average molecular weight of between about 10,000–50,000.

4. The method of claim 2, wherein the semipermeable membrane has a uniform cross-section.

5. The method of claim 2, wherein the polyacrylic acid support film is dipped in a leaching liquid comprising water between step (B) and (C) and removed from the casting surface.

6. The method of claim 2, wherein the leaching liquid of step (D) comprises water, and the membrane-support is removed from the casting surface.

7. The method of claim 6 wherein the leaching liquid is applied in step (D) by dipping for a time between about 5–60 minutes.

8. The method of claim 6, wherein the semipermeable membrane is selected from the group consisting of cellulosic ethers and cellulosic esters.

9. The method of claim 6 wherein the semipermeable membrane is a polymeric membrane made from aromatic nitrogen containing compounds selected from the group consisting of aromatic polyamides, aromatic polyhydrazides, aromatic polysemicarbazides and aromatic poly (amide-hydrazides).

10. The method of claim 6 wherein the semipermeable membrane is a polyamic acid salt.

11. The method of claim 6 wherein the semipermeable membrane is a polyamino-acid-amide.

12. The method of claim 6 wherein the leachable pore producing agent is selected from the group consisting of methyl alcohol, ethyl alcohol, N-propyl alcohol, isopropyl alcohol, tert-butyl alcohol, N-pentyl alcohol, isopentyl alcohol, allyl alcohol, ethylene glycol, formamide, triethyl phosphate and mixtures thereof.

13. The method of claim 12 wherein the polyacrylic acid solution also contains an effective amount of wetting agent and the casting surface is a glass plate.

14. A method of casting ultra-thin semipermeable reverse osmosis membranes having a substantially uniform cross section on a water soluble film support comprising the steps of:

A. applying a coating of polyacrylic acid polymer solution onto a smooth casting surface, wherein the solution contains between about 5–50 wt% water soluble polyacrylic acid solids having an average molecular weight between about 10,000–50,000, and about 1.5–5 wt% of a leachable pore producing agent having a water solubility of at least 50 gr/100 gr water, and then B. drying the polyacrylic acid coating to form a water soluble continuous substantially non-porous support film about 0.5–10 mils thick on the casting surface, and then C. applying a coating of an organic polymeric membrane casting solution onto the support film and drying the coating for between 15 seconds to 48 hours at between about 20°–200°C, to form a semipermeable reverse osmosis membrane having a substantially uniform cross section about 0.01–1.0 mil thick on the continuous support film, and then D. applying a leaching liquid comprising water to the membrane-support films effective to leach pore producing agent from the support film, for a time effective to separate the films from the casting surface and to cause formation of pores in the support film; to form a composite consisting of a 0.01–1.0 mil thick semipermeable membrane having a substantially uniform cross section supported by a 0.5–10 mil thick water soluble film support of between about 5–50% porosity.

15. The method of claim 14 wherein the pore producing agent has infinite solubility in 100 gr water, and the pores formed in the support film in step (D) are between about 0.025–0.25 microns diameter.

16. The method of claim 14 wherein the semipermeable membrane is a polymeric membrane made from aromatic nitrogen containing compounds selected from the group consisting of aromatic polyamides, aromatic polyhydrazides, aromatic polysemicarbazides and aromatic poly (amide-hydrazides).

17. The method of claim 14 wherein the semipermeable membrane is a polyamic acid salt.

18. The method of claim 14 wherein the semipermeable membrane is a polyamino-acid-amide.

19. The method of claim 14, including the following steps after step (D):

E. inserting the composite into a liquid purification system containing a feed solution inlet, feed solution exit and pure water exit, with the pure water exit being covered with microporous paper, wherein the polyacrylic acid film support of the composite is disposed next to the microporous paper, and then F. applying an aqueous feed solution against the porous membrane of the composite effective to dissolve the polyacrylic film support causing the membrane to cushion against the microporous paper.

* * * * *